United States Patent [19]
Waldrum

[11] Patent Number: 5,110,048
[45] Date of Patent: May 5, 1992

[54] SPRAY NOZZLES

[75] Inventor: John E. Waldrum, Ambler, Pa.

[73] Assignee: DowElanco, Indianapolis, Ind.

[21] Appl. No.: 621,355

[22] Filed: Dec. 3, 1990

[51] Int. Cl.⁵ .............................................. B64D 1/18
[52] U.S. Cl. ...................................... 239/171; 239/553
[58] Field of Search ............... 239/159, 171, 550, 553, 239/553.5; 244/136; 138/37, 40

[56] References Cited

U.S. PATENT DOCUMENTS

| | | | |
|---|---|---|---|
| 3,199,786 | 8/1965 | Waldrum | 239/223 |
| 3,285,516 | 11/1966 | Waldrum | 239/102 |
| 3,410,489 | 11/1968 | Waldrum | 239/171 |
| 3,445,065 | 5/1969 | Waldrum | 239/171 |
| 3,523,646 | 8/1970 | Waldrum | 239/171 |
| 3,673,946 | 7/1972 | Ragland | 138/37 |
| 3,878,992 | 4/1975 | MacManus | 239/553 |
| 3,920,184 | 11/1975 | Waldrum | 239/10 |
| 4,231,520 | 11/1980 | Waldrum | 239/171 |
| 4,454,988 | 6/1984 | Waldrum | 239/118 |
| 4,479,610 | 10/1984 | Etheridge et al. | 239/171 |
| 4,824,024 | 4/1989 | Bishop et al. | 239/171 |
| 4,892,255 | 1/1990 | Waldrum | 239/171 |

Primary Examiner—Andres Kashnikow
Assistant Examiner—Lesley D. Morris
Attorney, Agent, or Firm—Eckert Seamans Cherin & Mellott

[57] ABSTRACT

An improved spray nozzle for use with aircraft includes a small diameter, plastic body having a forward liquid inlet and a transverse cavity receiving liquid chemicals under pressure through the inlet. A plurality of capillary tubes in fluid communication with the cavity are secured in the body to open rearwardly in a horizontal, planar fan-shaped configuration protruding from a rear wedge shaped end of the body. The transverse distance across the body and the capillary tubes is less than one and one-half inches to minimize gravity pressure differentials across the plurality of tubes when the aircraft is banked to thereby prevent liquid chemical dribbling. A removable baffle is secured within the transverse cavity in position to be impinged by the entering liquid chemicals to equalize liquid flow and pressure throughout the cavity to thereby provide equal flow through each of the capillary tubes.

19 Claims, 3 Drawing Sheets

SPRAY NOZZLES

BACKGROUND OF THE INVENTION

1. Field of the Invention

The present invention relates generally to the field of aerial spraying equipment, and more particularly, is directed to an improved spray nozzle, particularly designed to prevent the dribbling of liquid chemicals upon completion of a spray run.

2. Background Information

In order to economically control weeds and other undesirable growths, it is now the common practice to utilize known systemic herbicides and specifically designed delivery systems such as aircraft which have been modified as necessary for agricultural use. When applying systemic herbicides, especially when employing aircraft, it is well known that only a few droplets of the systemic herbicide will be sufficient to kill a plant. Because of this, it is most important that the herbicides be directed precisely upon the target area and that care be taken to prevent drift and dribble of the material. Frequently, when the spraying operations cannot be adequately controlled, the systemic herbicides will attack economic crops and other agricultural growths which are not intended or desired to be removed. This is caused when the material being sprayed accidentally falls in a non-designated area such as may be occasioned by crosswinds, drafts and similar atmospheric conditions which might cause the herbicide droplets to be carried to the unwanted areas.

In order to reduce the damage caused by the drift of systemic herbicides, prior workers in the art have attempted to develop various chemical and mechanical means to increase droplet control and thereby decrease damage to valuable plant life. One previously utilized system involves the employment of a heavy invert herbicide emulsion to produce only large, heavy droplets during the spraying operations. In theory, the large, heavy droplets will be so large and so heavy that they will remain substantially unaffected by crosswinds and drafts during the application procedures. Because of this, the application of the herbicide to the designated area will be quite accurate and will be substantially unaffected by atmospheric conditions. While some success has been experienced when applying heavy invert emulsions, the use of such heavy invert emulsions has required added equipment costs and increased time factors, the combination of which have resulted in economic conditions which are so burdensome as to render the system to be only marginally successful.

In U.S. Pat. No. 3,445,065, the present applicant has invented and disclosed a uniform droplet discharge sprayer for use with aircraft. The uniform droplet sprayer employs a plurality of rearwardly extending, parallel nozzles appropriately connected to a transverse discharge line or boom through spring loaded hydraulic valves. The hydraulic valves were especially provided to control dribble from the nozzles following shut-off of the supply valve. In one embodiment, a sponge-like material was utilized to retain the liquid herbicides within the sprayer construction. The prior sprayer comprised a generally elliptical body section in airfoil form, having a single inlet, and a plurality of closely spaced nozzles connected to each sprayer. It has been found that when the sprayers disclosed in U.S. Pat. No. 3,445,065 were utilized for the aerial application of systemic herbicides, problems in dribble could develop if the liquid input to the sprayers was shut off while the aircraft was making a turn. The normal banking during turning of the aircraft caused the nozzles at one end of each sprayer to be elevated as much as one inch above the lowest nozzles at the opposite end of the sprayer. This differential in elevation and consequently in pressure could be sufficient to cause the top nozzle or nozzles of each sprayer to suck in air thereby simultaneously causing dribble from the lower nozzle or nozzles of each sprayer.

Similarly, in U.S. Pat. No. 3,523,646, the present applicant disclosed a plurality of sprayers supported upon the spray boom of a helicopter wherein each sprayer comprised a single inlet and a plurality of closely spaced discharge nozzles trailing from each sprayer. To accommodate the number of discharge nozzles required for adequate application purposes, each sprayer had to be constructed to be at least approximately six inches in length. Again, upon completion of a herbicide spraying run, and upon closing of the shut-off valve, some of the material remaining within the sprayers would be caused to dribble out and fall to the ground as the aircraft banked when making a turn, thus causing the discharge nozzles at one end of each sprayer to be elevated above the discharge nozzles at the lower end of the sprayer. The banking of the aircraft could cause as much as a one inch elevation differential between the lowermost discharge nozzle and the uppermost discharge nozzle of each sprayer. This differential could cause the top or uppermost discharge nozzles to suck in air and the bottom or lowermost discharge nozzles to dribble herbicide, thereby causing unwanted trailing and possible damage to crops or other plants in adjacent fields.

Accordingly, the need remains to provide an improved herbicides discharge nozzle construction that is capable of eliminating all dribbling upon completion of each spray run to thereby positively control the spray pattern, to prevent trailing and to prevent damage to adjacent areas.

SUMMARY OF THE INVENTION

The present invention relates generally to the field of aerial application of agricultural liquid sprays and more particularly is directed to an improved spray nozzle of unitary width of suitably small dimensions to eliminate the differential head at the nozzles which may be caused by the banking of an aircraft following a spray run.

The improved spray nozzles of the present invention each comprise generally a short, cylindrical, small dimension body preferably between one inch and one and one-half inches in diameter. Each body comprises a concentric forward inlet opening for receipt of an agricultural liquid, such as a herbicide, therethrough. The inlet opening terminates interiorly in a transverse plenum or cavity which is utilized to equalize pressures across the spray nozzle. A metallic baffle or pin is removably positioned within the cavity and is endwardly provided with fluid sealing shoulders to provide and maintain even distribution of fluid pressure within the cavity. A plurality of similar, small diameter equally spaced capillary tubes are secured in the body rearwardly of the cavity and in fluid communication therewith. Preferably, the capillary tubes are arranged in a fan-like configuration to provide substantially even distribution and a uniform spray pattern by filling the voids between the discharge nozzles as they are mounted upon the aircraft boom in equally spaced relationship.

Each discharge nozzle connection to the boom is equipped with a spring loaded diaphragm or other valve of known construction in usual manner wherein each valve is normally biased to the closed position. Upon activation of the aircraft spray pump, the system pressure developed will automatically function to open simultaneously the individual sealing members at each discharge nozzle to permit uniform spraying through the plurality of discharge nozzles in the designated manner. Following each herbicide application pass and immediately prior to making a turn, the aircraft operator will shut off the fluid supply pump, thereby causing automatic, spring biased closing of the diaphragm or other valves at each nozzle. Due to the short length of one inch or one and one-half inches across each of the plurality of capillary tubes of the nozzles, there will be insufficient pressure differential at the individual nozzles to cause air intake at the uppermost capillary tubes at one end of a nozzle and consequent dribble at the lowermost capillary tubes at the other end of the discharge nozzles. This novel discharge nozzle design allows an aircraft to make high inertia turns without trailing and without losing the material remaining in the nozzles after pump shut off and during banking of the aircraft following a spray run.

As utilized herein, the term "small diameter" as employed with a discharge nozzle is defined to mean a nozzle body having a width or diameter of approximately one and one-half inches or less, and preferably between one inch and one and one-half inches.

It is therefore an object of the present invention to provide an improved spray nozzle of the type set forth.

It is another object of the present invention to provide a novel spray nozzle for aerial spraying that is greatly reduced in width to thereby considerably reduce pressure differentials across the nozzle during banking of the aircraft.

It is another object of the present invention to provide a novel spray nozzle and/or array of nozzles which comprise a small diameter body, for example of molded plastic, a transverse cavity positioned within the body, a transverse baffle secured within the cavity to assure uniform herbicide volume and pressure across the cavity and a plurality of capillary tubes or orifices in fluid communication with the cavity whereby each orifice will be caused to spray liquid agricultural chemicals at uniform volume and pressure during spraying operations.

It is another object of the present invention to provide a novel spray nozzle comprising a cylindrical plastic body that is one and one-half inches or less in diameter, cavity means transversely positioned interiorly of the body, baffle means within the cavity means to directly receive the stream of material to be sprayed and to distribute the same uniformly throughout the cavity means and capillary tube means in fluid communication with the cavity means, the capillary tube means being arranged in a fan-shaped configuration to produce uniform material distribution between spaced nozzles.

It is another object of the present invention to provide a novel spray nozzle that is simple in design, inexpensive in manufacture and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views.

DESCRIPTION OF THE PREFERRED EMBODIMENT OF THE INVENTION

Figure 1:
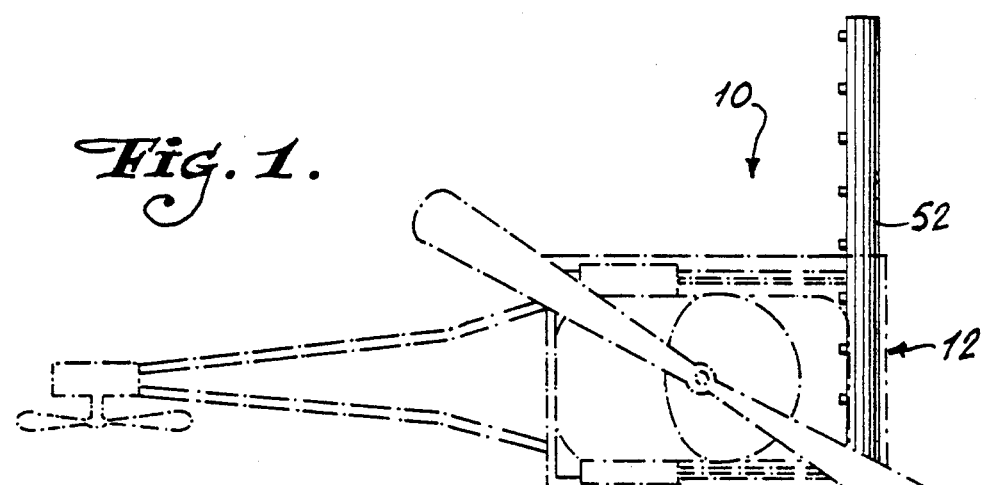
FIG. 1 is a top plan view of an aircraft, such as a helicopter, equipped with the improved spray nozzles of the present invention, and wherein the aircraft is shown in dotted outline.

Although specific terms are used in the following description for the sake of clarity, these terms are intended to refer only to the particular structure of the invention selected for illustration in the drawings, and are not intended to define or limit the scope of the invention.

Referring now to the drawings, there is shown in dotted outline in FIG. 1, an agricultural spray aircraft, such as a helicopter 10, equipped with a transverse spray boom 12 secured to the landing skids of the helicopter at the front thereof in well known manner. The spray boom 12 comprises generally a hollow conduit 52 of airfoil cross-sectional configuration which is intended and designed to receive agricultural liquids, such as herbicides (not shown) from the spray system pump (also not shown). As illustrated, the conduit 52 feeds the liquid to be sprayed to a plurality of transversely spaced spray nozzles 14.

Each of the plurality of spray nozzles 14 is attached to a nipple 50 which downwardly extends from one of the tapped openings or fittings (not shown) provided in the conduit 52 at spaced intervals, for example, between twelve inches and six inches on center. Fluid forces within the conduit 52 will be equalized throughout its length upon operation of the spray system pump due to flow constrictions according to the invention, so that all of the spray nozzles 14 connected to the elongate conduit 52 will receive substantially identical quantities of the liquid to be sprayed at substantially equal pressure. By equalizing the fluid forces within the system, it is anticipated that spraying from spray nozzles in equally spaced connections across the entire boom 12 will be uniform for all intents and purposes.

Figure 2:
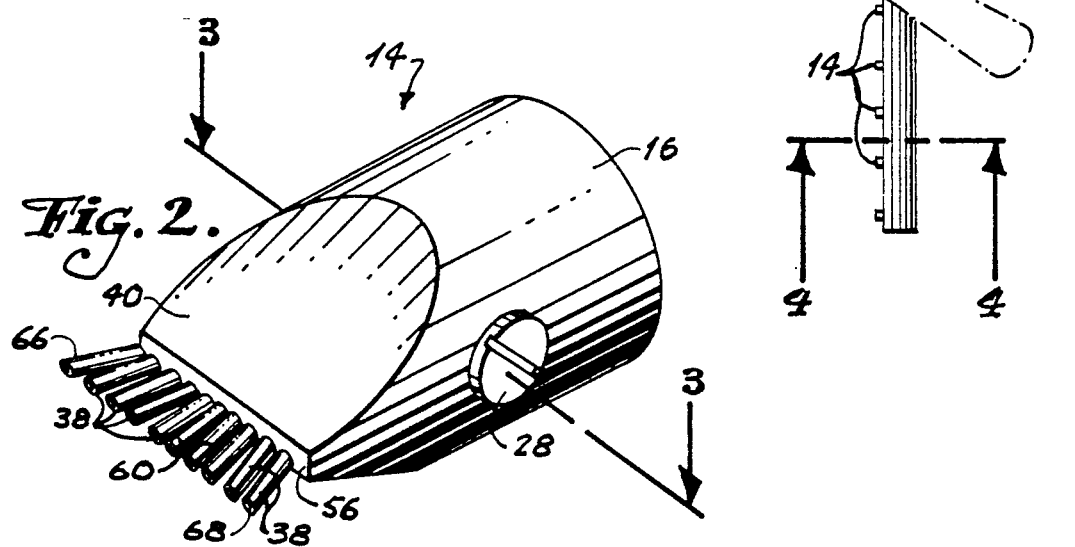
FIG. 2 is an enlarged, perspective view of an individual spray nozzle constructed in accordance with the teachings of the present invention.
Figure 3:
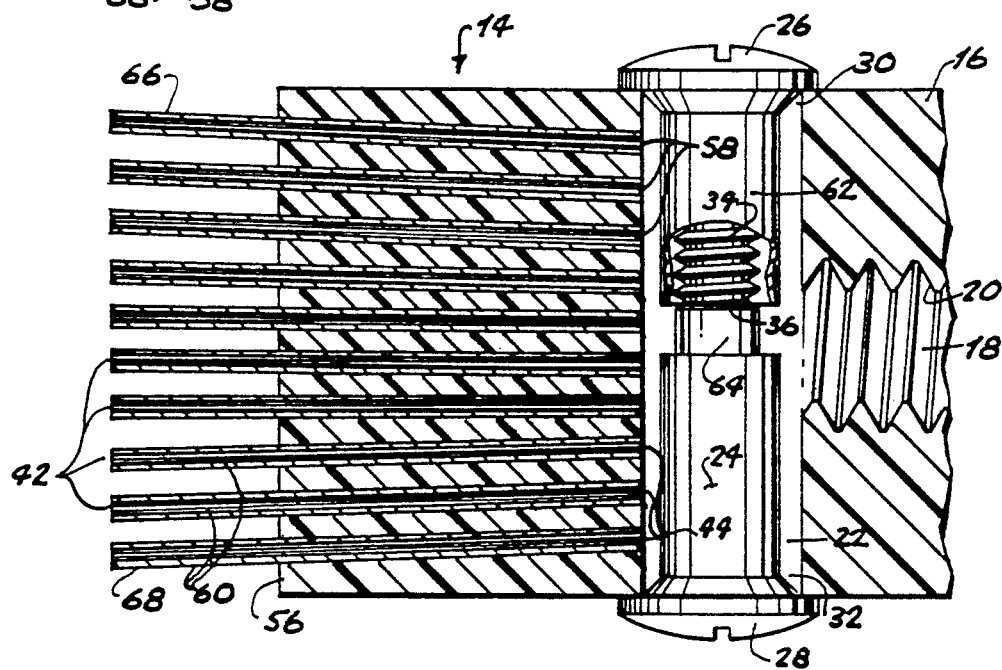
FIG. 3 is an enlarged, cross-sectional view taken along line 3—3 in FIG. 2, i.e., in a horizontal plane, and partially broken away to show interior construction details.
Figure 4:
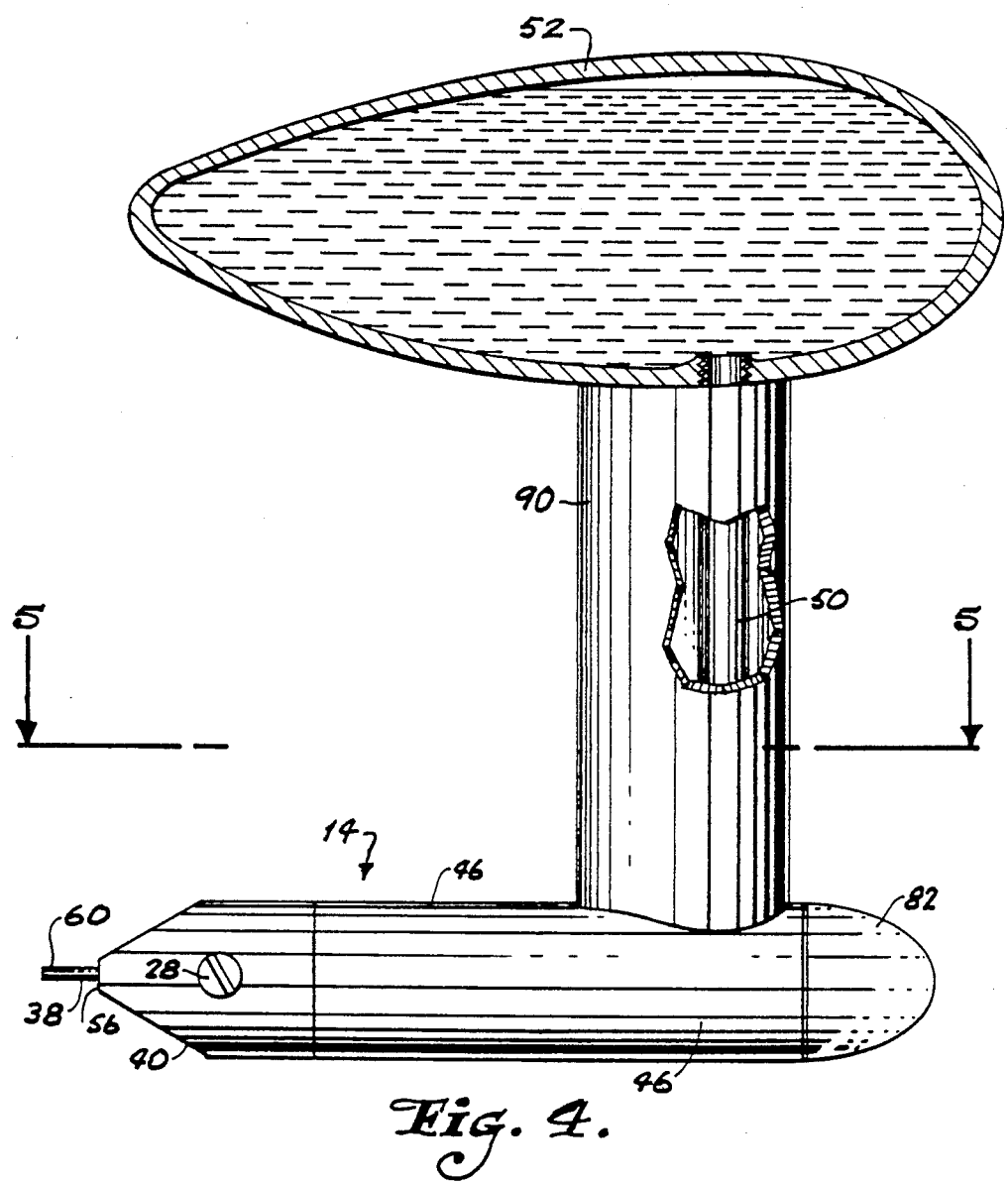
FIG. 4 is an enlarged, cross sectional view taken along line 4—4 on FIG. 1, looking in the direction of the arrows and partially broken away to expose interior construction details.
Figure 5:
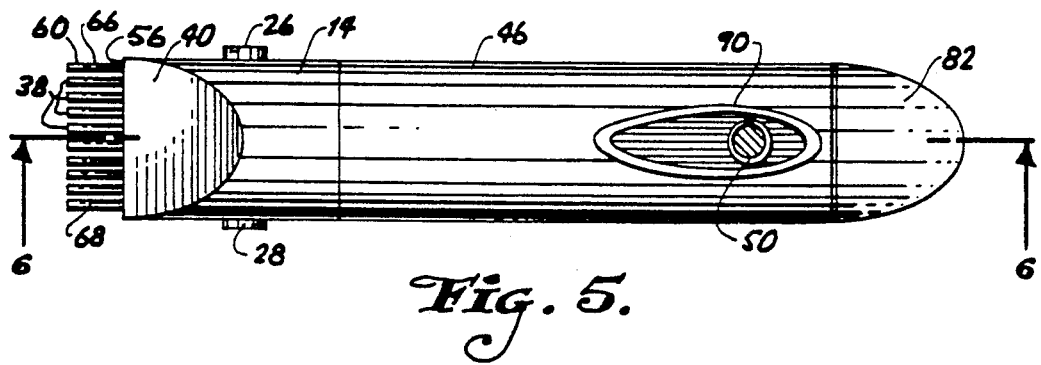
FIG. 5 is a cross sectional view taken along line 5—5 on FIG. 4, looking in the direction of the arrows.

Referring now to FIGS. 2 and 3, each spray nozzle 14 comprises generally a molded, hard plastic body 16 of a short configuration, preferably with a leading cylindrical portion leading to a trailing wedge-shaped portion, as seen in FIGS. 2 and 4. It is an important feature of this invention that the body 16 be fabricated to a small transverse dimension (e.g., diameter), for example, one and one-half inches in diameter or less. By limiting the nozzle body diameter to one and one-half inches or less, an unacceptably large pressure differential between the uppermost capillary tube and the lowermost capillary tube of each discharge nozzle 14 which might be caused by the banking of the helicopter 10 during turns following each spray run can be prevented. By minimizing any pressure differential between the left and right end capillary tubes 68, 66 of each of the plurality of spaced nozzles 14 during helicopter turns, air cannot be sucked into the uppermost capillary tubes or tubes of the respective nozzle arrays to thereby encourage leaking and/or dribbling from the lowermost capillary tube or tubes of any nozzles of any liquid material remaining in the nozzles following pump shut off.

The nozzle body 16 is molded, machined or otherwise worked to provide a transverse cavity 22 therein. A liquid inlet opening or borehole 18, which is preferably concentric with the outer surface of the cylindrical portion of the nozzle, is forwardly formed in the nozzle body 16 and this opening terminates rearwardly at the transverse cavity 22 and in fluid communication therewith. The inlet opening 18 may be provided with interior threads 20 to receive and connect therein to the exterior threads 48 of the hollow, cylindrical transition piece 46. Transition piece 46 is of similar, and preferably substantially identical diameter. It will be appreciated that the threaded interconnection 20, 48 is disclosed for illustrative purposes only and that other known, acceptable types of interconnections between each spray nozzle 14 and its associated transition piece 46 may be employed. For example, plastic welding, adhesives, etc. can be incorporated for interconnection purposes in known manner when so desired and still fall within the meaning and scope of this invention. For purposes of aerodynamic efficiency, the nozzle 14 can be countered at its inlet end so as to comprise a forward peripheral circular flange 70 of size and dimensions to snugly fit into a peripheral, cooperating recess 72 which can be formed at the trailing edge of the transition piece 46, providing a smooth interconnection.

A plurality of small, metallic or plastic capillary tubes 38 are secured within the nozzle body 16 and extend rearwardly exteriorly of the body 14 as illustrated. Preferably the capillary tubes 38 are arranged in a fan-shaped angular configuration suitable to fill lateral voids in the spray pattern between the spaced spray nozzles 14 during the actual spraying operations. The capillary tubes 38 extend rearwardly and forwardly from the trailing edge 56 of the plastic body 16 and terminate forwardly at entrances or junctions 58 to the transverse cavity 22 and in fluid communication therewith. Accordingly, all liquid material to be sprayed that enters the cavity 22 will be applied equally to the capillary tube entrances 58 within the interior cavity of each spray nozzle body 16. As best seen in FIGS. 2, 4 and 5, the trailing portion 40 of each spray nozzle body 16 is aerodynamically formed, e.g., in a wedge shape, to decrease turbulence in and about the exposed portions 60 of the capillary tubes 38.

As illustrated in FIGS. 3 and 6, a transverse rod-like baffle 24, which preferably is machined of suitable metallic, noncorrosive material, is secured within the transverse cavity 22. The baffle 24 is positioned to be impinged by the entering liquid and to initially receive and distribute the material to be sprayed which is introduced interiorly of the spray nozzle 14 through the liquid inlet opening 18. The baffle 24 conveniently is made in two parts and comprises mating male and female sections 62, 64 which are easily connected and disconnected from each other, for example, by mating threads 34, 36, and which are designed to provide leak-proof operation of the nozzle when in use and to facilitate easy access for cleaning of the capillary tubes 38 when the device is not in use.

The female baffle section 62 terminates exteriorly of the nozzle body in an enlarged baffle head 26 of size and configuration suitable to seal one transverse end opening of cavity 22 when the baffle sections are joined. The head 26 terminates inwardly in a shaped shoulder 30 for fluid direction and for fluid equalization purposes during the spraying operations. In the illustrated embodiment, the baffle section 62 terminates interiorly in an interiorly threaded socket 34 which threadably engages the exteriorly threaded stud 36 of the male baffle section 64 to facilitate assembly of the baffle. As shown, the mating baffle section 64 similarly terminates exteriorly in an enlarged baffle head 28 and interiorly is formed with a similar shoulder 32 for fluid control purposes. Fluid entering the spray nozzle 16 through the inlet opening 18 will first strike the baffle 24 and then spread evenly throughout and about the transverse cavity 22. The baffle 24 assure that equal quantities of fluid (not shown) at equal pressure will be applied to the respective fluid entrances 58 at the inlet ends 44 of each of the plurality of capillary tubes 38 to thereby provide for practically equal herbicide distribution through outlet ends 42 of each of the capillary tubes 38.

Referring now to FIGS. 1, 4 and 6, the plurality of spray nozzles 14 may be secured to the hollow conduit 52 at substantially equally spaced intervals, for example, twelve inches or six inches on center by employing the depending, threaded nipples 50. It is contemplated that the bottom structure of the hollow conduit 52 can be provided with a plurality of equally spaced, threaded openings (not shown) in well known manner to receive therein upper threaded portions of the threaded nipples 50. To control fluid flow, a diaphragm or similar valve 74 will be employed in association with each hollow cylindrical body 46 in manner well known to those skilled in the art. As illustrated, the valve 74 comprises a fluid pressure responsive closure such as a diaphragm, disc or poppet 78 which is normally biased to seat against the inlet end of the tube extension 76 by the coil spring 80. Suitable gaskets or other sealing devices may be employed as necessary to prevent any leakage between the diaphragm or other type of valve 74 and its interconnection with the body 46, also in well known manner. A smooth conical cover or end cap 82, which can include a leading port or vent 83, can be employed to facilitate the connection of the valve 74 to the cylindrical transition piece 46 in an aerodynamically efficient manner.

In accordance with usual practice, the diaphragm or other valve 74 is spring-loaded wherein the valve diaphragm, poppet or disc will be opened automatically by movement of the valve member 78 away from its seat on the forward end 84 of the tube extension 76 as caused by pressure against the valve diaphragm or poppet. The valve opening pressure will be the liquid pressure within the fluid containing hollow conduit 52 which will be generated upon operation of the helicopter spray pump (not shown) during the spraying runs. Upon completion of a spray run, the pilot or operator will shut off the pump in the usual manner, thereby simultaneously causing immediate pressure reduction in the hollow conduit 52. The pressure reduction in the conduit 52 will result in the simultaneous, automatic closing of each respective diaphragm or other type of valve 74, as well known to those skilled in the art.

As above set forth, even though there may remain some herbicide or other liquid within the capillary tubes 38 upon shut off of the spray pump, the short transverse distance between the first or rightmost capillary tube 66 of each spray nozzle 14 and the second or leftmost capillary tube 68 of the spray nozzle will be so small as to prevent build up of sufficient pressure differential upon banking the aircraft as to cause air to enter the transiently uppermost capillary tube. This will then positively eliminate dribbling of herbicide out of the lowermost capillary tube during the aircraft turning operations, after the spray pump has been inactivated. As above set forth, a distance of one and one-half inches or less between the left and right capillary tubes 66 and 68 has been found to be satisfactory to prevent trailing during turns.

Figure 6:
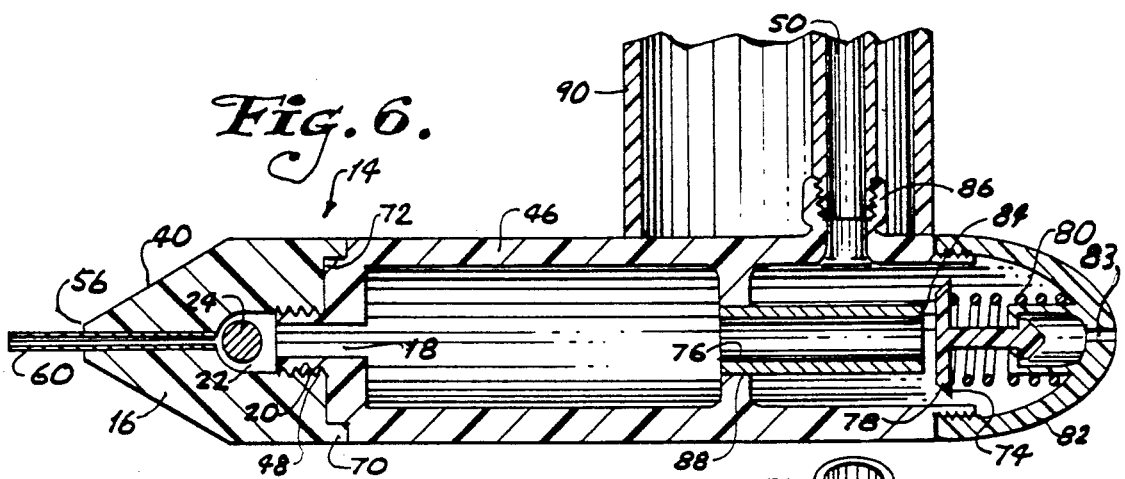
FIG. 6 is an enlarged, cross sectional view taken along line 6—6 on FIG. 5, looking in the direction of the arrows.
Figure 7:
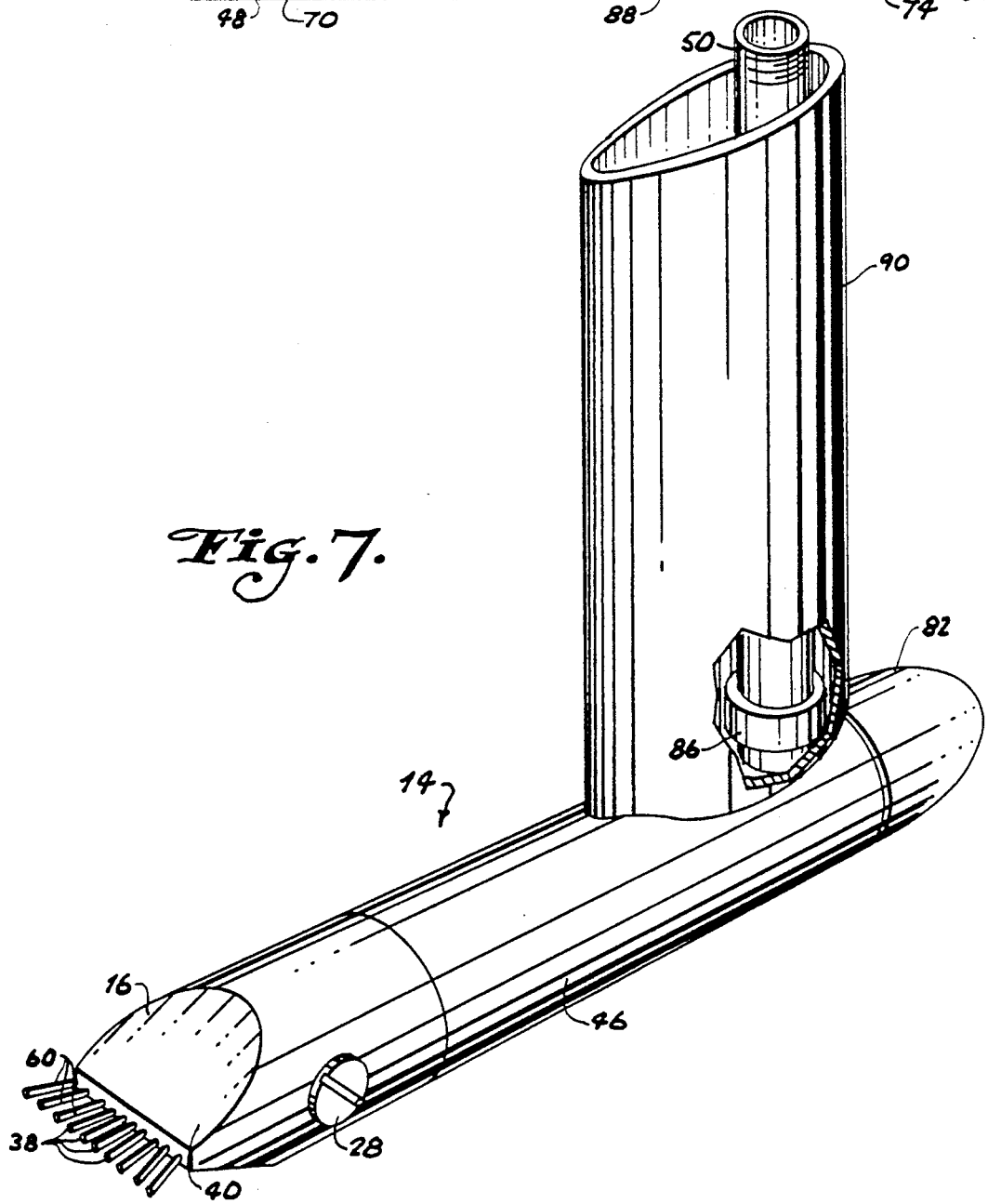
FIG. 7 is a perspective view of a spray nozzle assembly, partially broken away to expose interior construction details.

Referring to FIGS. 6 and 7, the nipple 50 can be connected to introduce the liquid to be sprayed into the forward portion of the cylindrical transition piece 46 through a conventional threaded socket 86 or other interconnection of known construction. As illustrated, the tube extension 76 mounts within the interior wall 88 in a manner to prevent rearward liquid flow thereabout. Accordingly, all liquid under pressure will flow towards the movable valve member 78 and will cause opening thereof. The liquid to be sprayed can then enter the tube extension 76 through the forward end 84 for subsequent discharge through the capillary tubes 38. Preferably, each of the nipples 50 is rendered more aerodynamically efficient by providing a shaped cover or sleeve 90 of airfoil cross sectional configuration. As illustrated each sleeve 90 extends vertically to overfit the entire length of the associated nipple from the boom 52 to the transition piece 46.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A spray nozzle for liquids, comprising:
   a body having a forward end and a rearward end portion leading to a rearward end, the body being provided with a transverse cavity intermediate said forward and rearward ends, the forward end being substantially circular in transverse section and the rearward end being substantially wedge shaped;
   a liquid inlet at the forward end of the body, the inlet opening into a short borehole and the borehole being in fluid communication with the cavity, permitting filling the cavity with liquid under pressure;
   a plurality of transversely spaced capillary tubes within the body in substantially a side-by-side array, the capillary tubes each having an inlet end and an outlet end, the inlet ends of the capillary tubes being in fluid communication with the transverse cavity to receive simultaneously discrete portions of liquid from the cavity, and the outlet ends of the capillary tubes extending rearwardly at least to the wedge shaped rearward end of the body to discharge discrete portions of liquid rearwardly of the body in the plurality of transversely spaced droplets; and,
   the body being small in width so as to minimize differential gravity pressure across the array of capillary tubes when the spray nozzle is loaded with liquid and the array is angularly oriented such that some said capillary tubes are elevated above other said capillary tubes, said width being sufficiently small to prevent dribbling of liquid from the other said capillary tubes when the array is angularly oriented.

2. The spray nozzle of claim 1, wherein the capillary tubes are defined by tubes sealingly received in boreholes in the wedge shaped rearward end of the body.

3. A spray nozzle for liquids, comprising:
   a body having a forward end and a rearward end portion leading to a rearward end, the body being provided with a transverse cavity intermediate said forward and rearward ends, the forward end being substantially circular in transverse section and the rearward end being substantially wedge shaped;
   a liquid inlet at the forward end of the body, the inlet opening into a short borehole and the borehole being in fluid communication with the cavity, permitting filling the cavity with liquid under pressure;
   a plurality of transversely spaced capillary tubes within the body in substantially a side-by-side array, the capillary tubes each having an inlet end and an outlet end, the inlet ends of the capillary tubes being in fluid communication with the transverse cavity to receive simultaneously discrete portions of liquid from the cavity, and the outlet ends of the capillary tubes extending rearwardly at least to the wedge shaped rearward end of the body to discharge discrete portions of liquid rearwardly of the body in a plurality of transversely spaced droplets, and wherein the array of capillary tubes is defined by a plurality of tubes sealingly secured in respective boreholes in the wedge shaped rearward end portion of the body in a diverging non-parallel relationship.

4. The spray nozzle of claim 1, further comprising a rod-shaped baffle within and aligned with the transverse cavity and extending to the ends thereof, the baffle being positioned to be impinged by liquid entering the transverse cavity through the liquid inlet.

5. The spray nozzle of claim 2, wherein the capillary tubes are secured in the body in a fan-shaped rearwardly diverging configuration.

6. The spray nozzle of claim 1, wherein the transverse cavity extends completely through the body to form first and second, diametrically spaced openings, having closures.

7. The spray nozzle of claim 6, wherein the closures are removable.

8. The spray nozzle of claim 7, further comprising a baffle within the transverse cavity, the baffle comprising first and second heads, the first and second heads overlying said first and second spaced openings to close said openings in liquid-tight closures.

9. The spray nozzle of claim 1. wherein the array of capillary tubes is arranged in planar alignment within the nozzle body.

10. A spray nozzle assembly for spraying liquid chemicals from an aircraft, comprising:

a nozzle body provided with a cavity extending transversely therethrough, the body having a forward end and a rearward end and a forward liquid inlet opening into a short borehole in fluid communication with the cavity, permitting the cavity to be loaded with liquid under pressure, the rearward end being disposed at the rear of a wedge shaped rear portion of the body;

a plurality of transversely spaced capillary tubes in the body, each capillary tube having a forward end and a rearward end, the said forward ends being in fluid communication with the cavity;

a transverse baffle within the cavity in position to be impinged by liquid chemicals entering the body through the liquid inlet, the baffle distributing the liquid chemicals uniformly throughout the cavity;

a transition piece connected to the forward end of the body and extending forwardly therefrom, the transition piece defining a hollow interior in fluid communication with the liquid inlet of the body for introducing a liquid chemical into the body, the transition piece being provided with a chemical feed opening; and, valve means intermediate the chemical feed opening and the hollow interior of the transition piece, the valve means permitting passage of the liquid chemical into the hollow interior when the liquid chemical is under pressure, the valve means automatically preventing passage of the liquid chemical into the hollow interior when the liquid chemical is not under pressure.

11. The spray nozzle assembly of claim 10, wherein the capillary tubes are defined by tubes secured in boreholes in the body and protruding rearwardly of the rearward end of the body.

12. The spray nozzle assembly of claim 10, wherein the capillary tubes are arranged in planar alignment with non-parallel rearwardly diverging fan-shaped configuration.

13. The spray nozzle assembly of claim 10. wherein the baffle comprises first and second heads, the cavity having first and second ends, the baffle heads sealing the first and second cavity ends to prevent escape of the liquid chemical at the cavity ends.

14. The spray nozzle assembly of claim 10, wherein the valve means comprises a tube extension secured within the transition piece, the tube extension having a fluid inlet in forward spaced relationship to the hollow interior of the transition piece and a fluid outlet in fluid communication with the hollow interior of the transition piece.

15. The spray nozzle assembly of claim 14, wherein the valve means further comprises a fluid pressure responsive closure operatively positioned forwardly of the tube extension fluid inlet, the closure being movable between a first, closed position in contact with the tube extension fluid inlet to prevent liquid chemical flow therethrough and a second, open position not in contact with the tube extension fluid inlet to permit liquid chemical flow therethrough.

16. The spray nozzle assembly of claim 15, wherein the valve means comprises a spring in contact with the fluid pressure responsive, closure, the spring continuously biasing the closure in a direction to contact the tube extension fluid inlet.

17. The spray nozzle assembly of claim 10, further comprising a depending nipple connected to and supplying liquid chemical under pressure to the transition piece chemical feed opening.

18. The spray nozzle assembly of claim 17, further comprising a hollow sleeve overfitting the nipple, the sleeve being configured in an airfoil cross sectional configuration to reduce drag and turbulence when the spray nozzle assembly is in use.

19. The spray nozzle assembly according to claim 10, wherein the body is small in width so as to minimize differential gravity pressure across the array of capillary tubes when the spray nozzle is loaded with liquid and the array is angularly oriented such that some said capillary tubes are elevated above other said capillary tubes, said width being sufficiently small to prevent dribbling of liquid from the other said capillary tubes when the array is angularly oriented.

* * * * *